(12) United States Patent
Maurio et al.

(10) Patent No.: US 12,395,575 B2
(45) Date of Patent: Aug. 19, 2025

(54) OUT OF BAND NETWORK AND PASSIVE INTERFACE DEVICE

(71) Applicant: The Johns Hopkins University, Baltimore, MD (US)

(72) Inventors: Joseph M. Maurio, Westminster, MD (US); James M. Rogers, Columbia, MD (US); Alexander W. Beall, Rockville, MD (US)

(73) Assignee: The Johns Hopkins University, Baltimore, MD (US)

( * ) Notice: Subject to any disclaimer, the term of this patent is extended or adjusted under 35 U.S.C. 154(b) by 872 days.

(21) Appl. No.: 17/590,106

(22) Filed: Feb. 1, 2022

(65) Prior Publication Data

US 2022/0247842 A1 Aug. 4, 2022

Related U.S. Application Data

(60) Provisional application No. 63/144,506, filed on Feb. 2, 2021.

(51) Int. Cl.
*H04L 69/40* (2022.01)
*H04L 9/40* (2022.01)
*H04L 69/18* (2022.01)

(52) U.S. Cl.
CPC .............. *H04L 69/40* (2013.01); *H04L 63/18* (2013.01); *H04L 69/18* (2013.01)

(58) Field of Classification Search
CPC ................................ H04L 69/40; H04L 63/18
USPC ........................................................ 370/252
See application file for complete search history.

(56) References Cited

U.S. PATENT DOCUMENTS

| 8,331,792 B2 * | 12/2012 | Jovanovich | ............ H04B 10/40 398/135 |
| 2011/0013705 A1 * | 1/2011 | Lin | .................... H04B 3/00 375/258 |
| 2012/0134428 A1 * | 5/2012 | Bobrek | ................ H04B 3/00 375/257 |
| 2017/0230204 A1 * | 8/2017 | Sivertsen | ........... H04L 25/0292 |

FOREIGN PATENT DOCUMENTS

| CN | 110995467 A * | 4/2020 | ............ H04L 49/10 |
| WO | WO-2017032163 A1 * | 3/2017 | ............ H04L 12/28 |

* cited by examiner

*Primary Examiner* — Christopher M Crutchfield
*Assistant Examiner* — Jean F Voltaire
(74) *Attorney, Agent, or Firm* — Noah J. Hayward

(57) ABSTRACT

A communications system includes a primary network communicating in accordance with a first communications protocol an out-of-band (OOB) network communicating in accordance with a second communications protocol. The primary network includes first and second primary network nodes, which are connected via a twisted-pair cable. The first primary network node is configured to transmit first communications protocol signals on the twisted-pair cable to the second primary network node. The OOB network includes first and second OOB network nodes, which are connected to the twisted-pair cable via a first OOB passive interface device connected between the first primary network node and the second primary network node. The second OOB network node is connected to the twisted-pair cable via a second OOB passive interface device connected between the first and second primary network nodes.

19 Claims, 10 Drawing Sheets

OUT OF BAND NETWORK AND PASSIVE INTERFACE DEVICE

CROSS-REFERENCE TO RELATED APPLICATIONS

This application claims priority to and the benefit of prior-filed, U.S. Provisional Application No. 63/144,506 filed on Feb. 2, 2021, the entire contents of which are hereby incorporated herein by reference.

TECHNICAL FIELD

Exemplary embodiments generally relate to communications systems, and more specifically relate to out of band communications systems.

BACKGROUND

With the vast connectivity of communications networks, network security has become an increasingly difficult issue to address. The risk that malware or a network intruder can gain access to a communications network to inhibit or alter the network's behavior continues to increase as the sophistication of the attacks increase. While network monitoring may provide a means for detecting and thwarting such attacks, such approaches are only effective until the attackers identify a weakness in such monitoring and exploit it.

Another option for thwarting such attacks is to implement network redundancy. In this regard, some network operators maintain completely separate networks that are ready to be activated in the event that a primary network is lost due to, for example, an attack or an unrelated device or system failure. Such redundancy can be effective, but is costly to construct and maintain because duplicate equipment and connectivity is needed and ultimately under-utilized. In many instances, such costs can be so significant that implementation of a redundant network is unrealistic. As such, techniques for implementing redundant and alternative networks in a manner that saves cost are desired and would be beneficial.

BRIEF SUMMARY

According to some example embodiments, a communications system is provided. The communications system includes a primary network communicating in accordance with a first communications protocol. The primary network includes a first primary network node and a second primary network node. The first primary network node and the second primary network node may be connected via a twisted-pair cable. The first primary network node may be configured to transmit first communications protocol signals on the twisted-pair cable to the second primary network node. The communications system may also include an out-of-band (OOB) network communicating in accordance with a second communications protocol. The OOB network may include a first OOB network node and a second OOB network node. The first OOB network node may be connected to the twisted-pair cable via a first OOB passive interface device that is connected between the first primary network node and the second primary network node. The second OOB network node may be connected to the twisted-pair cable via a second OOB passive interface device that is connected between the first primary network node and the second primary network node. The first OOB passive interface device may be configured to receive second communications protocol signals from the first OOB network node and inject the second communications protocol signals onto the twisted-pair cable with the first communications protocol signals. The second OOB network node may be configured to receive and extract the injected second communications protocol signals from the twisted pair cable for provision to the second OOB network node. Extraction of the injected second communications protocol signals may be performed such that the first communications protocol signals are received by the second primary network node unaffected by the injection of the second communications protocol signals.

According to some example embodiments, an out-of-band (OOB) passive interface device is provided. The OOB passive interface device may include a first Ethernet port, a second Ethernet port, and an OOB communications protocol port. The OOB passive interface device may also include a first transformer and a second transformer. A first pair of conductors from the first Ethernet port may be connected to first terminals of the first transformer and a second pair of conductors from the second Ethernet port may be connected to second terminals of the first transformer. A third pair of conductors from the first Ethernet port may be connected to first terminals of the second transformer and a fourth pair of conductors from the second Ethernet port may be connected to second terminals of the second transformer. A first OOB interface conductor may be connected from a centertap of the first transformer to the OOB communication protocol port. A second OOB interface conductor may be connected from a centertap of the second transformer to the OOB communication protocol port.

According to some example embodiments, a method for implementing an out-of-band (OOB) network is provided. The method may include receiving first communications protocol signals via a receiving twisted-pair cable, and receiving second communications protocol signals at an OOB communications protocol port. The method may further include injecting the second communications protocol signal, as a differential signal, between a first twisted-pair and a second twisted-pair, with the first communications protocol signals, and transmitting the first communications protocol signals with the second communications protocol signals via the first twisted-pair and the second twisted-pair on a transmitting twisted-pair cable.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
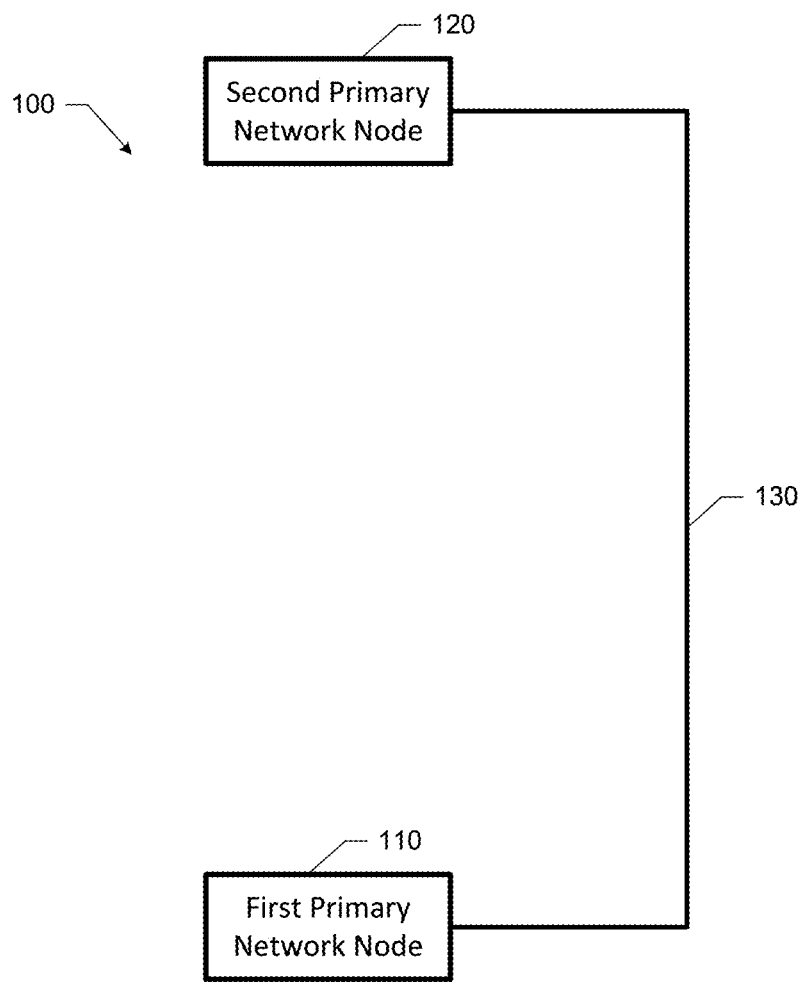
FIG. 1 illustrates an example primary network according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

According to some example embodiments, a network solution is provided that allows for the implementation of an out-of-band (OOB) network on the same twisted-pair cabling as a primary network. The OOB network may be implemented in a manner that the OOB devices, and the OOB network itself, operates separate from the primary network. While the primary network and the OOB network may share some portion of a physical layer in the form of shared twisted-pair cabling, the existence and operation of the OOB network may be invisible and undetectable by primary network devices. As such, the OOB network may be operated as a redundant network that resides in a separate security domain from the primary network such that a security threat to the primary network need not be a security threat to the OOB network. Further in the event that the threat is a non-physical layer threat that affects the primary network, the affects may be not be realized on the OOB network which may continue to operate unaffected by the impact to the primary network.

While the OOB network may be leveraged for use in a network security context, the OOB network, according to some example embodiments, may be utilized as an isolated communications channel. For example, according to some example embodiments, the OOB network may be used for command and control, while, for example, the primary network is being used for data transfer. Further, according to some example embodiments, the OOB network may be utilized for situational awareness in isolation from the primary network.

To implement the OOB network, according to some example embodiments, OOB passive interface devices may be utilized as bump-in-the wire components. As such, the OOB passive interface devices may be added to already existing Ethernet infrastructure thereby realizing a significant cost savings for implementing a separate network. An OOB passive interface device may be an electronic device configured to inject or extract OOB network signaling from the shared twisted-pair cabling. Due to the positioning of the OOB passive interface devices, the signaling for the OOB network may be injected and extracted between nodes of the primary network. Therefore, the primary network devices, according to some example embodiments, cannot see the OOB network signaling because it is injected behind a primary network device (or node) and extracted before a next connected primary network device.

As such, an OOB network device (or node) connected to an OOB passive interface device may cause the OOB passive interface device to inject signaling onto the twisted-pair cabling for transmission within the OOB network. Alternatively, the OOB network device may cause the OOB passive interface device to extract signaling for receipt by the OOB network device from the twisted-pair cabling. To do so, according to some example embodiments, the OOB passive interface device may include a centertap transformer for each twisted-pair in the twisted-pair cabling. The OOB network signaling may be injected as a differential signal applied between two centertap connections on transformers, for example, connected to respective twisted-pairs. Because the centertap connections are used, the injection of the OOB network signaling on each individual twisted-pair has no relative effect, since only the differential between the signals on the conductors of the twisted-pair is of significance to the primary network. Since the OOB network signaling is applied between twisted-pairs via the centertap transformers, no differential on a single twisted-pair is introduced. Further, because the injected OOB network signaling is extracted, also via centertap transformers at the receive end, the primary network is not aware that any modification to the signaling on the twisted-pair cabling occurred. The primary network signaling is therefore received at a primary network destination device without any indication that the OOB network signaling had been injected.

As such, the twisted-pair cabling may be utilized for the separate networks, thereby reducing the cost of realizing such redundancy and/or the additional communications channel, while also supporting high data rates. Additionally, the OOB passive interface devices may be passive devices that leverage a transformer to perform the injection and extraction of signaling. Due to the lack of active components such as processing devices on the OOB passive interface devices, the cost of the devices can be quite low. Additionally, such a passive approach can also improve reliability and availability of the devices and the network. As such, the overhead needed to implement the OOB network may be relatively small allowing for, for example, increased security at a low cost.

As such, the OOB network may be operated as a diverse communication channel and network from the primary network that, for example, uses different types of components and signaling, without requiring substantial additional infrastructure. According to some example embodiments, the OOB network described herein may have a wide variety of applications that are related to network security and/or independent network operation. The primary network and the OOB network may be operated as cyber-physical system architecture. For example, the OOB network may be leveraged in the context of utility systems for security and control. Because the OOB network may not be visible to the primary network, the OOB may be more difficult to attack and therefore sensitive control signals may be transmitted on the OOB network. In this regard, for example, relay control signaling for electric substation breakers may be provided via the OOB network. Similarly, valve controls for water systems may be transmitted via the OOB network. As such, the operation of the OOB network with the primary network may be leveraged in a variety of ways that can be implemented on separate networks without the cost of entirely separate infrastructure. Further, in the event that the primary network is lost, the OOB network may be leveraged to perform a primary network restart or primary network node restart where real-time controls may be necessary during the restart and can be provided via the OOB network. Additionally, the OOB network may be leveraged for independent data or instruction verification and secure data exchange.

Having described some aspects of example embodiments, reference will now be made to FIG. 1, which illustrates a primary network 100, in complete isolation. The primary network 100 may be a simplified representation of a network having a first primary network node 110, a second primary network node 120, and a twisted-pair cable 130. The first primary network node 110 may be connected to the second primary network node 120 via twisted-pairs of the twisted-pair cable 130. The primary network 100 may be a local area network, a metropolitan area network, a wide area network, or the like.

A network node may be any type of device that resides as a networked entity on the network. As such, a network node may be edge device (e.g., a server, a terminal, etc.) or a midstream device (e.g., a router, a switch, or the like). The first primary network node 110 and the second primary network node 120 may be edge devices as shown in FIG. 1. However, in another example embodiment, the nodes may be embodied as midstream devices. In any event, as further described below, communications and associated signaling may be generated by one of the first primary network node 110 or the second primary network node 120 for receipt by the other of the first primary network node 110 or the second primary network node 120.

The twisted-pair cable 130 may include a plurality of twisted-pairs. According to some example embodiments, the twisted-pair cable 130 may include two or four twisted-pairs. The twisted-pair cable 130 may be, for example, shielded or unshielded, and copper-based. Such twisted-pair cabling may be used for Ethernet implementations in the context of, for example, a local area network. In this regard, in accordance with Ethernet protocols, a twisted-pair may be utilized to deliver a signal as a differential signal between the two conductors of a given pair. Because of the twisted relationship of the conductors, common mode noise that exists on both conductors may be ignored, since the differential signal is the signal of interest. However, according to some example embodiments, because the introduction of common mode signals on both of the conductors can be injected without a loss of signal characteristics for the differential signal on the twisted-pair, additional signaling may be injected to support the operation of an alternative network, i.e., an OOB network.

As such, in operation, the primary network 100 may leverage the twisted-pair cable 130 to transmit communications between the first primary network node 110 and the second primary network node 120. Such communications may involve use of one or more of the twisted-pairs of the twisted-pair cable 130. According to some example embodiments, the primary network 100 may communicate via first communications protocol. The first communications protocol may be any type of communications protocol that may be implemented on the twisted-pair cable 130, such as transmission control protocol (TCP), Internet protocol (IP), user datagram protocol (UDP), orthogonal frequency multiplexing (OFDM), or the like.

Figure 2:
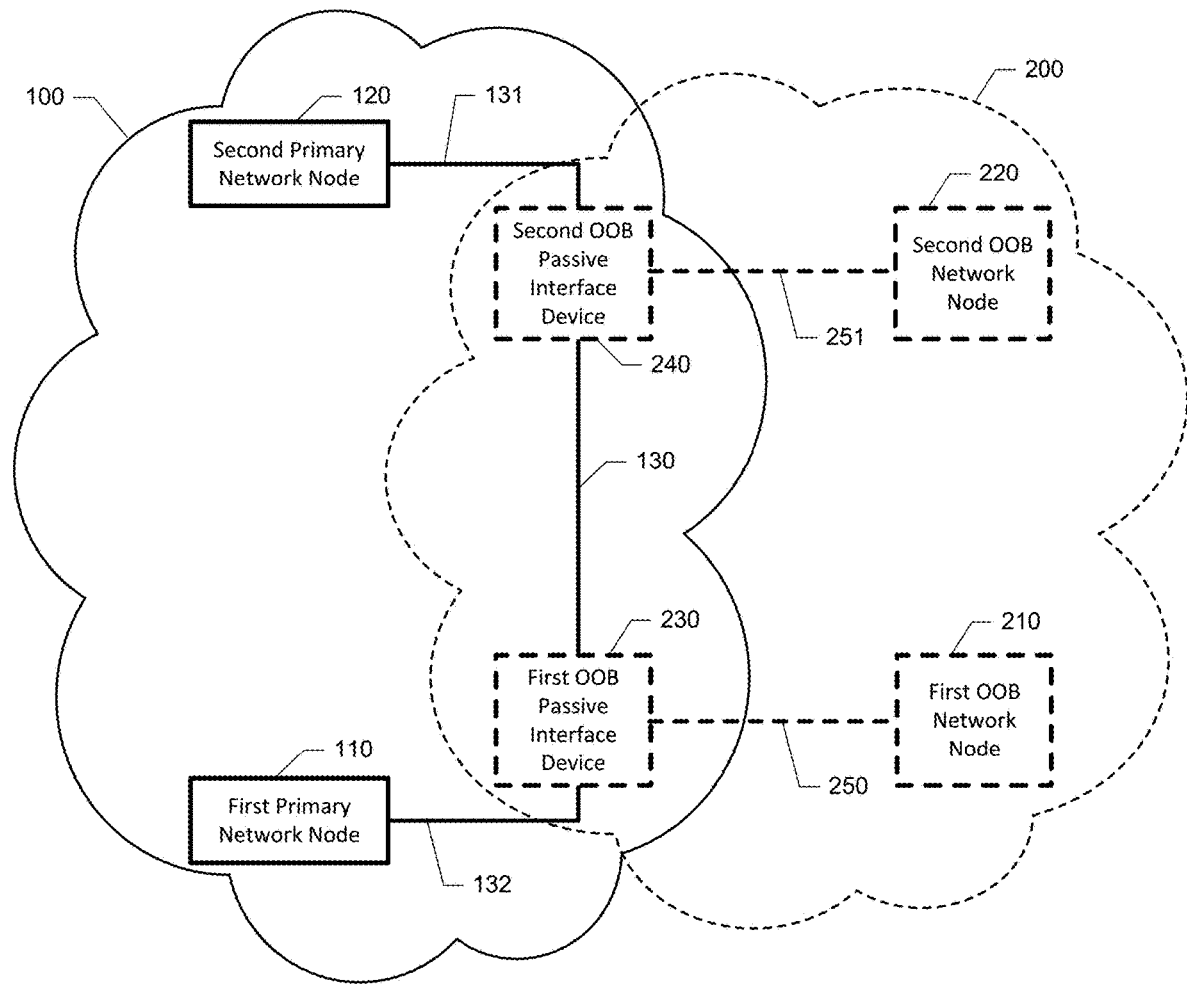
FIG. 2 illustrates an example primary network operating with an out-of-band network according to some example embodiments.

Now referring to FIG. 2, the primary network 100 is shown in combination with an OOB network 200, according to some example embodiments. The primary network 100 including the first primary network node 110, the second primary network node 120, and the twisted-pair cable 130 are shown within the primary network cloud (solid line).

An OOB network 200 is also shown within an OOB network cloud (dashed line). The OOB network 200 may include a first OOB network node 210, a second OOB network node 220, a first OOB passive interface device 230, and a second OOB passive interface device 240. Following from the description above, the first OOB network node 210 and the second OOB network node 220 may be nodes on the OOB network 200. As such, the first OOB network node 210 and the second OOB network node 220 may be any type of device that resides as a networked entity on the OOB network 200. The first OOB network node 210 and the second OOB network node 220 may be edge devices (e.g., a server, a terminal, etc.) or midstream devices (e.g., a router, a switch, or the like). In any event, as further described below, communications and associated signaling may be generated by one of the first OOB network node 210 or the second OOB network node 220 for receipt by the other of the first OOB network node 210 or the second OOB network node 220.

The first OOB network node 210 may be connected to the OOB network 200 via a connection 250 to the first OOB passive interface device 230. Similarly, the second OOB passive interface device 240 may be connected to the OOB network 200 via a connection 251 to the second OOB passive interface device 240. As OOB passive interface devices, the first OOB passive interface device 230 and the second OOB passive interface device 240 may operate as a passive interface for OOB network nodes to gain access to the OOB network 200. The OOB passive interface devices may be connected to the twisted-pair cable 130 such that the primary network signals on the twisted-pair cable 130 pass through the OOB passive interface devices. Since the OOB passive interface devices are in-line devices, the twisted-pair cable 130 may be separated or cut to allow for the OOB passive interface devices to be installed in an in-line configuration. As a result of the first OOB passive interface device 230 being installed in this manner, the first primary network node 110 may be connected to the first OOB passive interface device 230 via a connection 132, which may include twisted-pair cabling. Similarly, as a result of the second OOB passive interface device 240 being installed in this manner, the second primary network node 120 may be connected to the second OOB passive interface device 240 via a connection 131, which may include twisted-pair cabling.

The twisted-pair cable 130, on the other hand, may be shared resource between the primary network 100 and the OOB network 200 on the physical layer. As such, signaling for both networks (i.e., the primary network 100 and the OOB network 200) may be present on the twisted-pair cable 130. As further described below, the OOB passive interface devices may be configured to operate in a manner that couples or bundles the primary network signaling with the OOB network signaling on the twisted-pair cable 130. Additionally, the OOB passive interface devices may operate as pass-through devices for signaling for the primary network 100.

In operation, the OOB network 200 may leverage the twisted-pair cable 130 to transmit communications between the first OOB network node 210 and the second OOB network node 220. Such communications may involve the use of one or more of the twisted-pairs of the twisted-pair cable 130. According to some example embodiments, the OOB network 200 may communicate via second communications protocol, which may be same or different from the first communications protocol used by the primary network 100. The second communications protocol may be any type of communications protocol that may be implemented on the twisted-pair cable 130, such as transmission control protocol (TCP), Internet protocol (IP), user datagram protocol (UDP), orthogonal frequency division multiplexing (OFDM), or the like. Further, according to some example embodiments, a serial communications protocol or any other two-wire protocol may be implemented by the OOB network 200, which may be limited, for example, only by the quality of the cabling that supports the signaling.

According to some example embodiments, while the primary network 100 and the OOB network 200 may share resources (e.g., the twisted-pair cable 130), the primary network 100 and the OOB network 200 may operate using different communications protocols. For example, while the primary network 100 may operate using TCP, the OOB network 200 may implement a serial communications protocol. Due to the operation of the OOB passive interface devices, communication signaling for the two different protocols may reside on the shared resources without creating interference. Further, due to the placement of the OOB passive interface devices, signaling for the OOB network 200 may be injected and extracted between nodes of the primary network 100. Therefore, the signaling for the OOB network 200 may not be accessible (or even visible) to a node on the primary network 100.

Accordingly, the operation of the primary network 100 and the OOB network 200 may involve, for example, first communications signaling according to a first communications protocol for the primary network 100 being transmitted by the first primary network node 110 to the second primary network node 120. Additionally, second communications signaling according to a second communications protocol for the OOB network 200 may be transmitted by the first OOB network node 210 to the second OOB network node 220. As such, the first communications signaling may be received at the first OOB passive interface device 230 via connection 132. Additionally, the second communications signaling transmitted by the first OOB network node 210 may also be received at the first OOB passive interface device 230 via the connection 250. The first OOB passive interface device 230 may be configured to inject the second communications signaling onto twisted-pairs of the twisted-pair cable 130 with the first communications signaling. As such, the aggregate or combined signaling on the twisted-pair cable 130 may include both the first communications signaling and the second communications signaling, with the first communications signaling essentially passing through the first OOB passive interface device 230 and the second communications signaling being injected onto the twisted-pair cable 130 with the first communications signaling.

When the combined signaling is received at the second OOB passive interface device 240, the second OOB passive interface device 240 may be configured to extract the second communications signaling from the combined signaling. The extracted second communications signaling may be then be provided to the second OOB network node 220 for receipt, without inference from the first communications signaling. Additionally, the second OOB passive interface device 240 may transmit the first communications signaling, without interference from the second communications signaling, to the second primary network node 120 for receipt.

As such, while the primary network 100 and the OOB network 200 utilize the twisted-pair cable 130, the primary network 100 and the OOB network 200 operate separately and are not susceptible to a common network attack (unless, for example, the twisted-pair cable 130 is physically attacked). Further, if the primary network 100 is offline, the OOB network 200 may still continue to operate, and if the OOB network 200 is offline the primary network 100 may still continue to operate. Additionally, while the OOB passive interface devices see communications signaling and associated traffic from both networks, the network nodes (e.g., the first primary network node 110, the second primary network node 120, the first OOB network node 210, and the second OOB network node 220) need not be aware of the signaling or traffic associated with the other network. In other words, operation of the first primary network node 110 and the second primary network node 120 may unaffected by the existence and operation of the first OOB network node 210 and the second OOB network node 220. Similarly, the first OOB network node 210 and the second OOB network node 220 may unaffected by the existence and operation of the first primary network node 110 and the second primary network node 120. Additionally, because the OOB passive interface devices are, according to some example embodiments, passive devices that do not include a processor or other active hardware, the OOB passive interface devices are generally insusceptible to direct network attacks, making the OOB passive interface devices reliable and hardy, and able support operations of one network when the other network is down.

Figure 3:
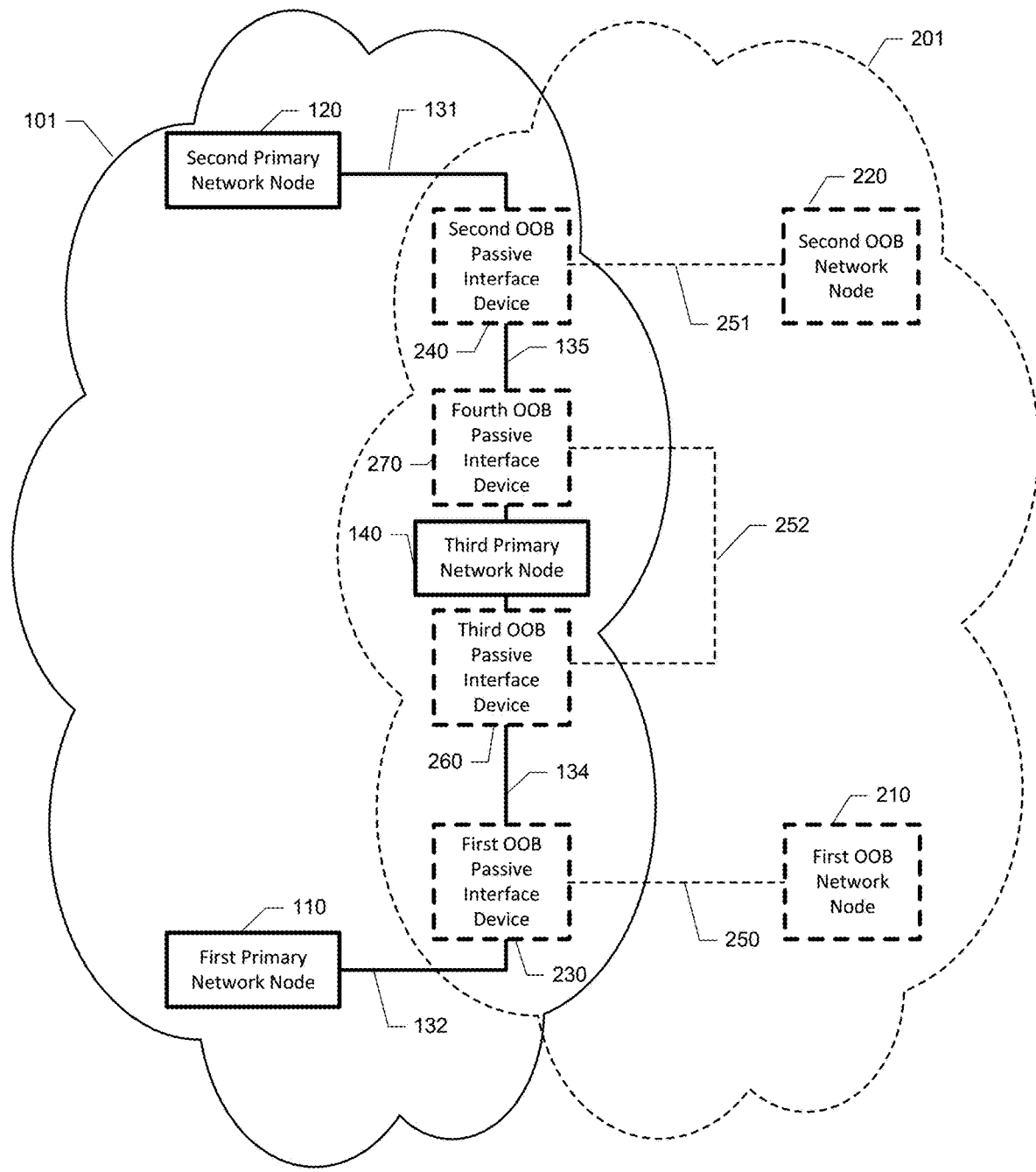
FIG. 3 illustrates an example primary network operating with an out-of-band network including an out-of-band bridge according to some example embodiments.

Turning now to FIG. 3, a modified primary network 101 and a modified OOB network 201 are shown. The primary network 101 is similar to the primary network 100 with the exception that a midstream third primary network node 140 (e.g., a router, switch, etc.) is connected between the first primary network node 110 and the second primary network node 120. As such, the twisted-pair cable 130 is separated in networks of FIG. 3 into a twisted-pair cable portion 134 and a twisted-pair cable portion 135.

Because of the placement of the third primary network node 140, additional OOB passive interface devices 260 and 270, and an OOB bridge 252 may be included in the OOB network 201, relative to the OOB network 200 of FIG. 2. In this regard, following from the signaling scenario described above with respect FIG. 2, the first communications signaling from the first primary network node 110 may essentially pass through the first OOB passive interface device 230, the third OOB passive interface device 260, the third primary network node 140, the fourth OOB passive interface device 270, and the second OOB passive interface device 240 to arrive at the second primary network node 120.

The second communications signaling from the first OOB network node 210 may travel through the OOB bridge 252 to arrive at the second OOB network node 220. In this regard, the second communications signaling from the first OOB network node 210 may injected onto the portion of the twisted-pair cable portion 134 with the first communications signaling. The third OOB passive interface device 260 may receive the combined signaling, extract the second communications signaling, and pass the first communications signaling to the third primary network node 140. The extracted second communications signaling may be routed through the OOB bridge 252 (e.g., a wired connection which may be a twisted-pair cable) to the fourth OOB passive interface device 270. In doing so, the third primary network node 140 does not have access or visibility to the second communications signaling. The fourth OOB passive interface device 270 may then re-inject the second communications signaling onto the portion of the twisted-pair cable portion 135, again with the first communications signaling. Upon receipt by the second OOB passive interface device 240, the second OOB passive interface device 240 may be configured to extract the second communications signaling for provision to the second OOB network node 220 and pass the first communications signaling to the second OOB network node 220.

As such, through the implementation of the OOB passive interface devices signaling for the OOB network 200 need not be accessible to a primary network node, even when a primary network node is disposed in-line with a travel path for signaling of the OOB network 200. Accordingly, each primary network node may be bracketed by OOB passive interface devices to avoid signaling for the OOB network 200 passing to a node of the primary network.

Figure 4:
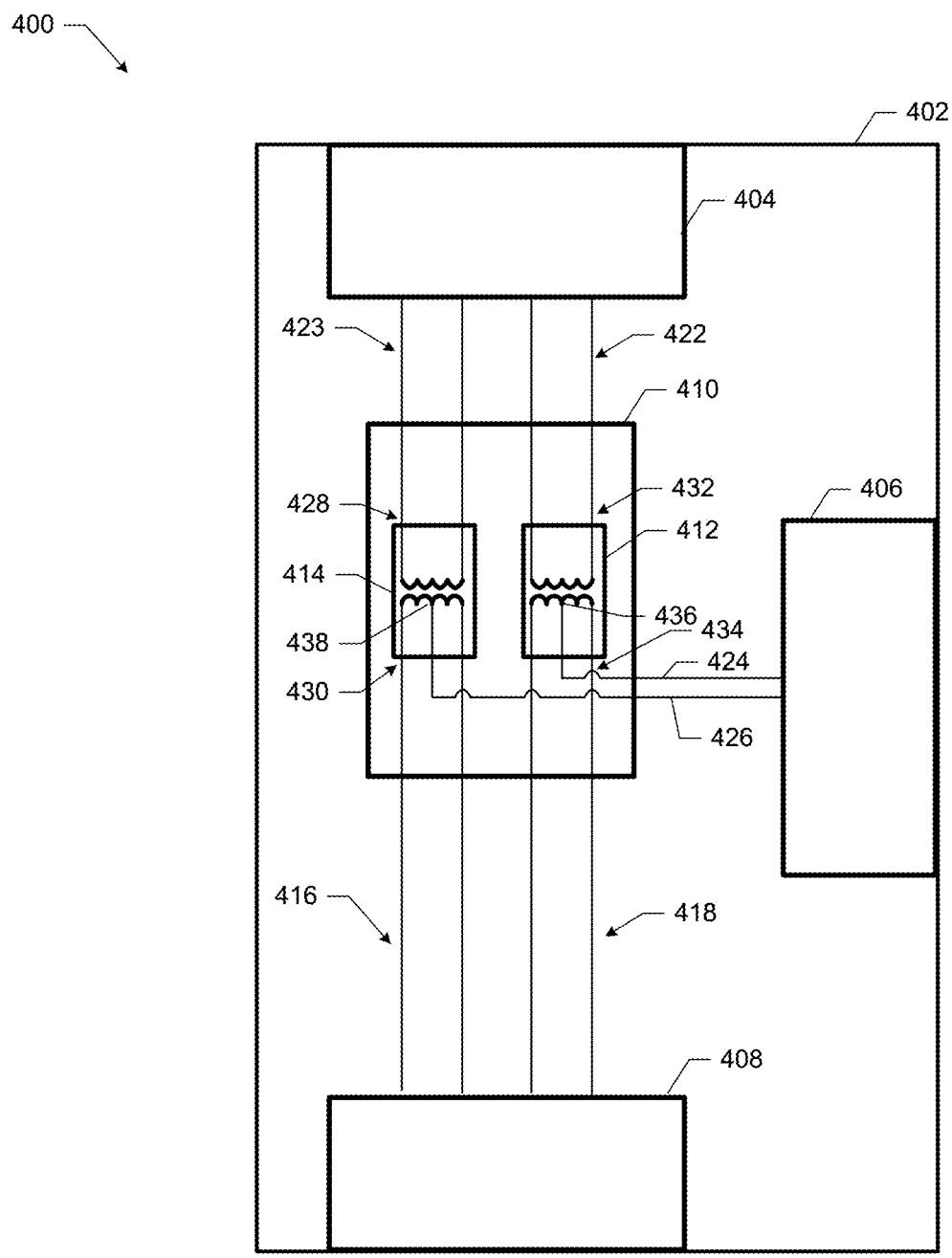
FIG. 4 illustrates an example out-of-band passive interface device according to some example embodiments.

Having generally described the network level operation for implementing an OOB network, FIG. 4 will now be described which illustrates the components of an example OOB passive interface device 400. In this regard, the OOB passive interface device 400 may include a circuit board 402 with a first connector 404, a second connector 408, and an OOB connector 406 affixed thereto. According to some example embodiments, the first connector 404 and the second connector 408 may be connection points to twisted-pair cables that may or may not be shared resource cables between a primary network and an OOB network. As such, the first connector 404 and the second connector 408 may be, for example, RJ45 connectors configured to connect with an RJ45 plug coupled to a twisted-pair cable having two or four twisted pairs. As such, the first connector 404 and the second connector 408 may be configured to operate as a first Ethernet port and a second Ethernet port. In example embodiment of OOB passive interface device 400, the first connector 404 and the second connector 408 may be configured to support connections to a twisted-pair cable with two active twisted-pairs. In this regard, conductor pair 423 may be connected to a first twisted-pair of a cable connected to the first connector 404 and conductor pair 422 may be connected to a second twisted-pair of the cable connected to the first connector 404. Similarly, conductor pair 416 may be connected to a first twisted-pair of a cable connected to the second connector 408 and conductor pair 418 may be connected to a second twisted-pair of the cable connected to the second connector 408. The OOB connector 406, which may be configured to operate as an OOB communications protocol port, may be connected to an OOB network node to receive signals from or transmit signals to the OOB network node. The signals may be OOB communications protocol signals for transmission or reception on the OOB network. According to some example embodiments, the OOB connector 406 may be serial port connector, such as a DB9 connector.

The OOB passive interface device 400 may also include transformers 412 and 414, which may be part of a transformer bank 410. The transformers 412 and 414 may be rated for Ethernet voltages and may have a 1:1 turns ratio. Because the transformers 412 and 414 may have a 1:1 (or unity) turns ratio, signals that are received at terminals on one side of the transformer may be output as the same (or substantially similar) signals at the terminals on the other side of the transformer (because no step up or step down in voltage occurs through the transformer). As such, signals received by second connector 408 and provided to conductor pair 416 may be received at transformer terminals 430 of transformer 414, and the same signals may be output on the terminals 428 of the transformer 414 and conductor pair 423 for provision to first connector 404. Similarly, signals received by second connector 408 and provided to conductor pair 418 may be received at transformer terminals 434 of transformer 412, and the same signals may be output on the terminals 432 of the transformer 412 and conductor pair 422 for provision to first connector 404. Again, because the transformers 412 and 414 have a 1:1 turns ratio, signals that are received at the first connector 404 that travel through the transformers 412 and 414 may be as the same signals at the second connector 408.

However, according to some example embodiments, the transformers 412 and 414 may include a centertap on one or both sides of the transformer and signals applied to the centertap may cause changes to an output signal of the transformers 412 and 414 relative to the input signal. The centertap may be a connection to a transformer coil at a midpoint of the coil. As such, the transformer 414 may have a centertap 438 and the transformer 412 may have a centertap 436. As shown in FIG. 4, conductor 424 is connected between the OOB connector 406 and the centertap 436, and conductor 426 is connected between the OOB connector 406 and the centertap 438.

The centertap connections to the transformers 412 and 414 may be used to inject OOB network signals received via the OOB connector 406 onto the conductor pairs or extract OOB network signals from the conductor pairs for provision to the OOB connector 406. In this regard, because the signal on, for example, conductor 424 is applied to the centertap 436, the effect of the signal on the conductor pairs 418 or 422 (and the connected twisted-pairs) results in no additional differential voltage between the conductors of the conductor pairs. As such, the injection of the signal and the associated voltage at the centertap 436 results in no loss of information in the signals that were already present on the conductor pairs 422 and 418. However, information from conductor 424 (and an OOB network node connected to OOB connector 406) has still been added to the conductor pairs 418 and 422 as a non-differential dynamic offset. Similarly, a signal on the conductor 426 may be applied to the centertap 438. Again, the effect of the signal on the conductor pairs 416 or 423 (and the connected twisted-pairs) results in no additional differential voltage between the conductors of the conductor pairs. As such, the injection of the signal and the associated voltage at the centertap 438 results in no loss of information in the signals that were already present on the conductor pairs 416 and 423. However, information from conductor 426 (and an OOB network node connected to OOB connector 406) has still been added to the conductor pairs 416 and 423 as a non-differential dynamic offset.

However, a differential signal between the conductors 424 and 426 may be applied to the centertaps 436 and 438, respectively. Such a differential signal would generate a non-differential offset on each individual set of conductor pairs (i.e., conductor pairs 418 and 422, and conductor pairs 416 and 423), but a differential may exist between the signals on the conductor pairs (i.e., between conductor pairs 418 and 422, and conductor pairs 416 and 423) and may be implemented without generating interference or loss of information. In other words, a differential signal for the OOB network may be applied between the conductor pairs without impacting the information in the signals on each of the conductor pairs (and the associated twisted-pairs of a cable). In this way, OOB network signals can be injected as a differential signal on two twisted-pairs to realize the OOB network.

In a similar manner, OOB network signals may be extracted from the conductor pairs (i.e., conductor pairs 418 and 422, and conductor pairs 416 and 423) to remove a previously injected non-differential offset on each set of conductor pairs and evaluate the signals as a differential signal for the OOB network. The extraction of the injected non-differential offset from the centertaps of the transformers 412 and 414 removes the energy from the signal on the conductor pairs to return the signals on the conductor pairs to the signals that existed on the conductor pairs prior to the injection. As such, via a coupled set of OOB passive interface devices 400, OOB network signals can be injected and extracted, without interfering with or otherwise impacting the primary network signals that reside on the twisted-pair cabling connecting the coupled set of OOB passive interface devices 400.

It is noteworthy that the use of centertap transformers, according to some example embodiments, provides for injection and extraction of OOB network signals, without the use of active components such as signal processors and the like. Due to the passive characteristics of the OOB passive interface device 400, the device itself is not susceptible to malware and other network attacks that may be lodged against active components. Accordingly, a successful attack on, for example, the primary network would not affect the operation of the OOB passive interface devices 400, and therefore, the OOB network may continue to operate. The passive characteristics of the OOB passive interface devices 400 may allow the networks to operate in different security domains, even though the OOB passive interface devices 400 have an operational role in both the primary and the OOB networks.

Additionally, according to some example embodiments, the OOB passive interface device 400 may be configured to operate within a power-over-Ethernet (PoE) context. In this regard, a number of different PoE standards have been defined for use in powering devices directly from the Ethernet or twisted-pair cabling. PoE introduces power onto the twisted-pairs in a manner that does not create a differential between the conductors of the twisted-pairs. However, according to some example embodiments, the OOB passive interface device 400 may be configured to inject the OOB signaling between the twisted-pairs as described herein, regardless of whether a non-differential offset for PoE is present on the twisted-pair cabling. Accordingly, the OOB network may be implemented as described herein in the context of a PoE system that uses, for example, PoE Mode A or Mode B.

Figure 5:
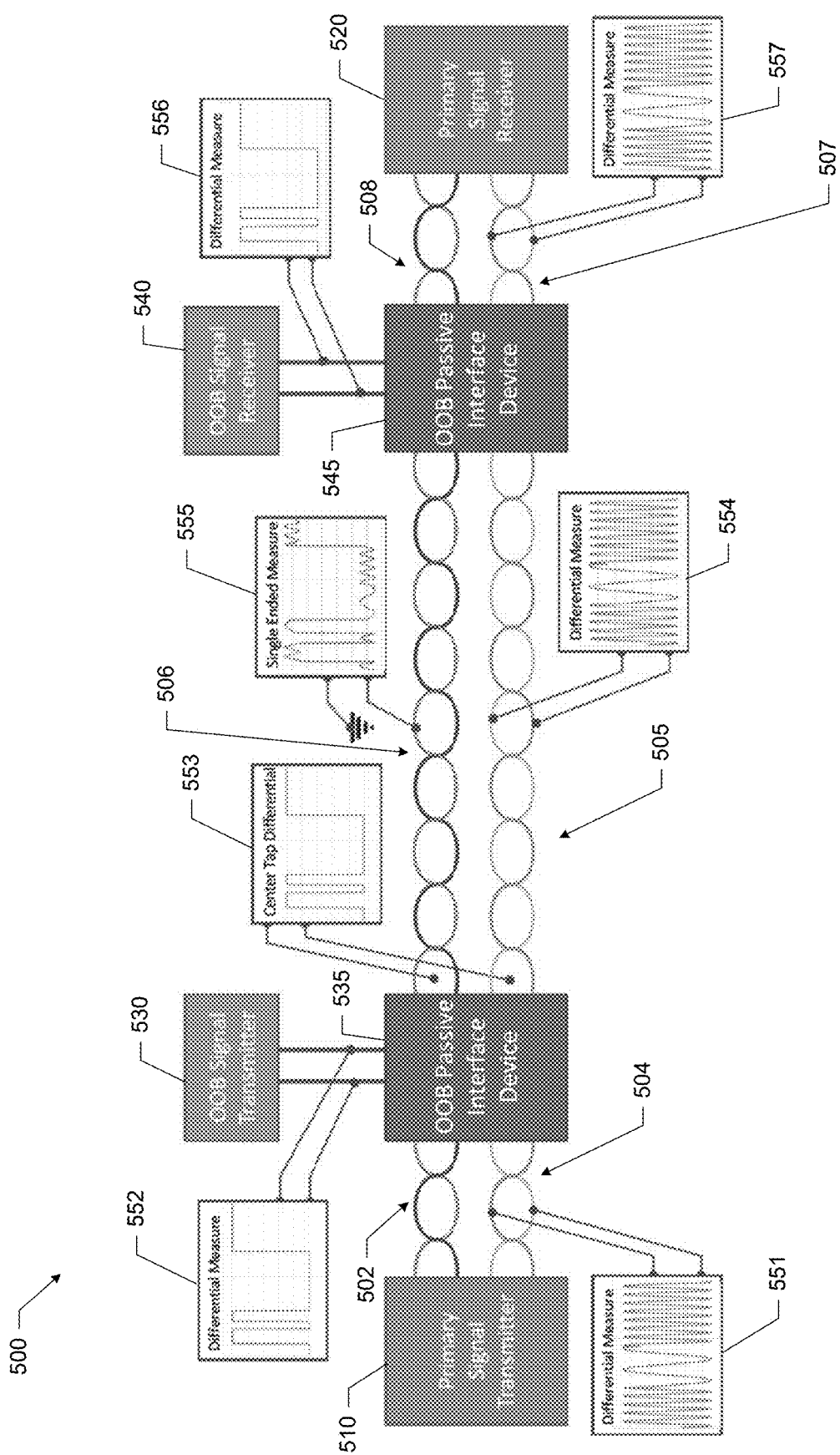
FIG. 5 illustrates another example primary network operating with an out-of-band network showing signaling examples according to some example embodiments.

Now referring to FIG. 5, a system 500 is shown that includes a primary network and an OOB network similar to the configuration shown in FIG. 2. However, FIG. 5 illustrates example signaling that may be present within the system 500. The system 500 includes a two twisted-pair cabling configuration. A first twisted-pair includes twisted-pair segments 502, 506, and 508. A second twisted-pair includes twisted-pair segments 504, 505, and 507. These twisted-pairs are connected from the primary signal transmitter 510 to the OOB passive interface device 535, to the OOB passive interface device 545, to the primary signal receiver 520. An OOB signal transmitter 530 is connected to the OOB passive interface device 535, and an OOB signal receiver 540 is connected to the OOB passive interface device 545. The OOB passive interface devices 535 and 545 may be constructed and configured to operate in the same or similar manner as the OOB passive interface device 400.

With respect to the example operational scenario shown in FIG. 5, it can be seen that a first primary network signal (e.g., a data signal) is being transmitted by the primary signal transmitter 510 onto the twisted-pair segment 504 of the second twisted-pair. A differential measurement of the primary network signal between the conductors of the twisted-pair segment 504 is shown at graph 551. Although not shown, a second primary network signal is also applied by the primary signal transmitter 510 to the twisted-pair segment 502 of the first twisted-pair.

The first primary network signal on the twisted-pair segment 504 and the second primary network signal on the twisted-pair segment 502 may be received by the OOB passive interface device 535. The OOB passive interface device 535 may also receive an OOB signal from the OOB signal transmitter 530. A differential measurement of the OOB signal between the conductors from the OOB signal transmitter 530 is shown at graph 552. The OOB passive interface device 535 may be configured to inject the OOB signal as a differential signal between the first twisted-pair and the second twisted-pair (e.g., on centertap transformers of the OOB passive interface device). Accordingly, a measurement of the centertap differential between the first twisted-pair at segment 505 and second twisted-pair at segment 506 is shown at graph 553. As can be seen, the measurement of the OOB signal in graph 552 is the same as the signal shown in graph 553 indicating that the OOB signal has been injected as a differential signal between the first twisted-pair and the second twisted-pair. Additionally, as shown in the graph 554, a differential measurement of the signal between the conductors of the first twisted-pair at segment 505 is shown. As can be seen, despite the injection of the OOB signal, the signal shown at graph 554 is the same as the first primary network signal shown at graph 551. Additionally, a single ended measurement may have been taken on the segment 506 and is shown at graph 555. Because the graph 555 shows a single ended measurement, as opposed to a differential measurement, characteristics of the second primary signal and the OOB signal can be seen.

The OOB passive interface device 545 may receive the signals on the segments 505 and 506 and extract the OOB signal (e.g., via centertap transformers) for provision to the OOB signal receiver 540. A differential measurement of the signal received between the conductors of the OOB signal receiver 540 shown in graph 556 reveals that the signal is the same as the OOB signal in graph 552 and the centertap differential signal shown in graph 556. Additionally, a differential measurement between the conductors of the first twisted-pair at 507 shown in graph 557 reveals that the signal on the segment 507 and provided to the primary signal receiver 520 is the same as the first primary signal shown in graph 551. As such, the first primary (and the second primary signal) and the OOB signal have been transmitted through the system without interference.

Figure 6A:
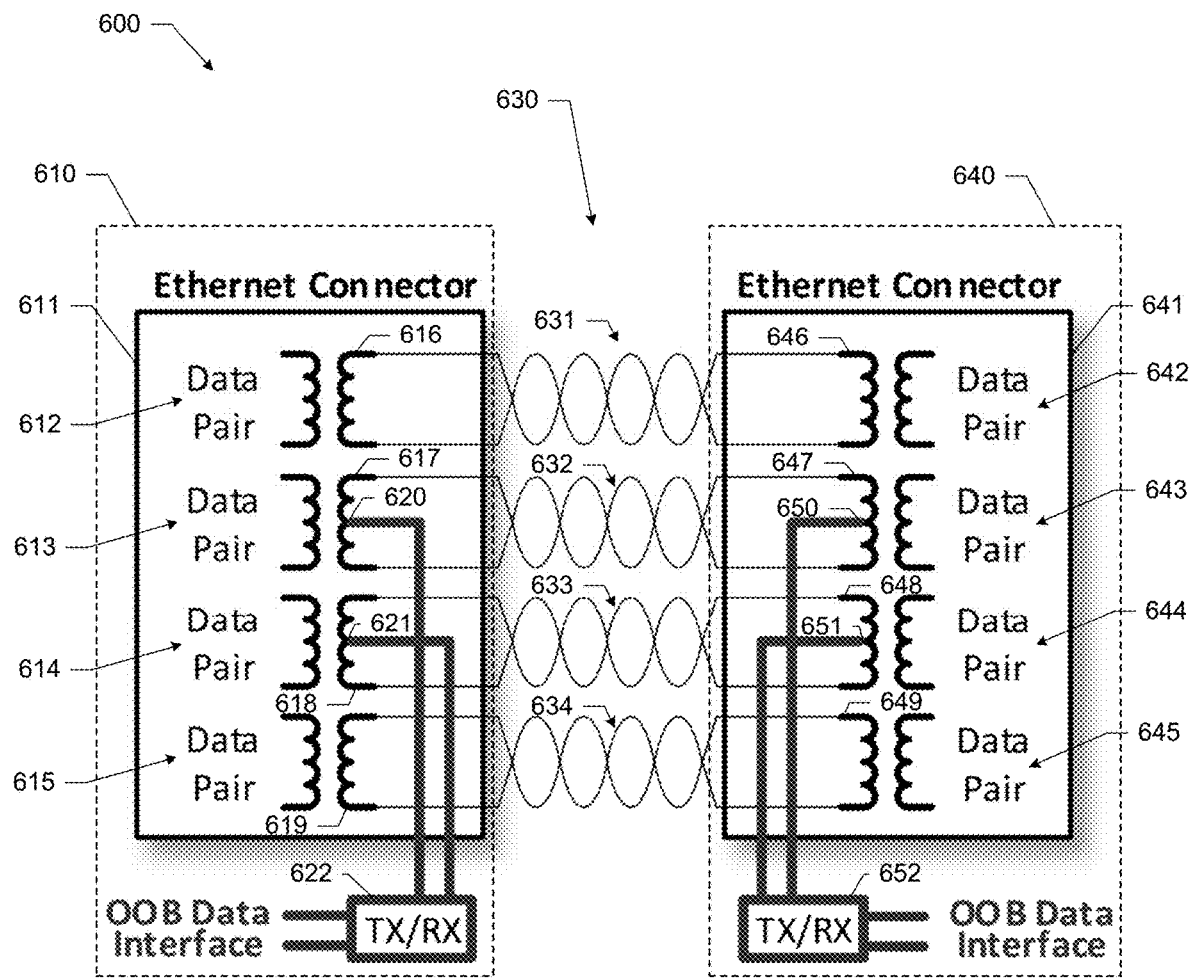
FIG. 6A illustrates components of an example out-of-band network that operates with two-wire out-of-band passive interface devices according to some example embodiments.

FIG. 6A will now be described, which depicts an example embodiment of an OOB network 600. The OOB network 600 includes a first OOB passive interface device 610, a twisted-pair cable 630, and a second OOB passive interface device 640. The first OOB passive interface device 610 and the second OOB passive interface device 640 may be configured to operate as two-wire devices that support two-wire communications protocols (e.g., RS-485) on the OOB network 600. The first OOB passive interface device 610 may include an Ethernet connector 611, which in turn, may include a transformer bank. The transformer bank of the first OOB passive interface device 610 may include four transformers (i.e., one for each twisted-pair of a connected cable). Transformers 616, 617, 618, and 619 may be configured to connect to data pairs (or twisted-pairs) 612, 613, 614, and 615, respectively. The transformers 616, 617, 618, and 619 may also be connected to twisted-pairs 631, 632, 633, and 634 of the cable 630, respectively. Transformers 617 and 618 may have centertaps 620 and 621, respectively, that may be connected as a transmit or receive OOB data interface 622. Accordingly, signals provided to the OOB data interface 622 may be injected onto the twisted-pairs 632 and 633 as a differential signal in combination with the primary signals provided via the data pairs 613 and 614 for provision to the second OOB passive interface device 640. Alternatively, signals may be extracted via the centertap 620 and 621 from the twisted-pairs 632 and 633 as a differential signal and provided as an output via the OOB data interface 622.

The second OOB passive interface device 640 may include an Ethernet connector 641, which in turn, may include a transformer bank. The transformer bank of the second OOB passive interface device 640 may include four transformers (i.e., one for each twisted-pair of a connected cable). Transformers 646, 647, 648, and 649 may be configured to connect to data pairs (or twisted-pairs) 642, 643, 644, and 645, respectively. The transformers 646, 647, 648, and 649 may also be connected to twisted-pairs 631, 632, 633, and 634 of the cable 630, respectively. Transformers 647 and 648 may have centertaps 650 and 651, respectively, that may be connected as a transmit or receive OOB data interface 652. Accordingly, signals provided to the OOB data interface 652 may be injected onto the twisted-pairs 632 and 633 as a differential signal in combination with the primary signals provided via the data pairs 643 and 644 for provision to the first OOB passive interface device 610. Alternatively, signals may be extracted via the centertap 650 and 651 form the twisted-pairs 632 and 633 as a differential signal and provided as an output via the OOB data interface 652.

While the example embodiment shown in FIG. 6A indicates that the twisted-pairs 632 and 633 are used to support operation of the OOB network 600, it is understood that the centertaps of any two transformers, connected to any two corresponding twisted-pairs, may be used to support the operation of the OOB network 600 to support a two-wire communications protocol. For example, a centertap of transformer 616 may be used in conjunction with a centertap of transformer 619. Additionally, when the cabling of the system includes four twisted-pairs, two OOB networks or channels may be implemented on respective sets of twisted-pairs (i.e., with two twisted-pairs in each set) where each set operates in according with a two-wire communications protocol. In this regard, the configuration as shown in FIG. 6A may be implemented to operate a first OOB network on twisted-pairs 632 and 633. However, a second OOB network may also be implemented using, for example, a centertap of transformer 616 and a centertap of transformer 619 to operate the second OOB network on twisted-pairs 631 and 634. In such a configuration, for example, two separate serial signaling channels may be implemented that use a two-wire protocol (e.g., RS-485).

Figure 6B:
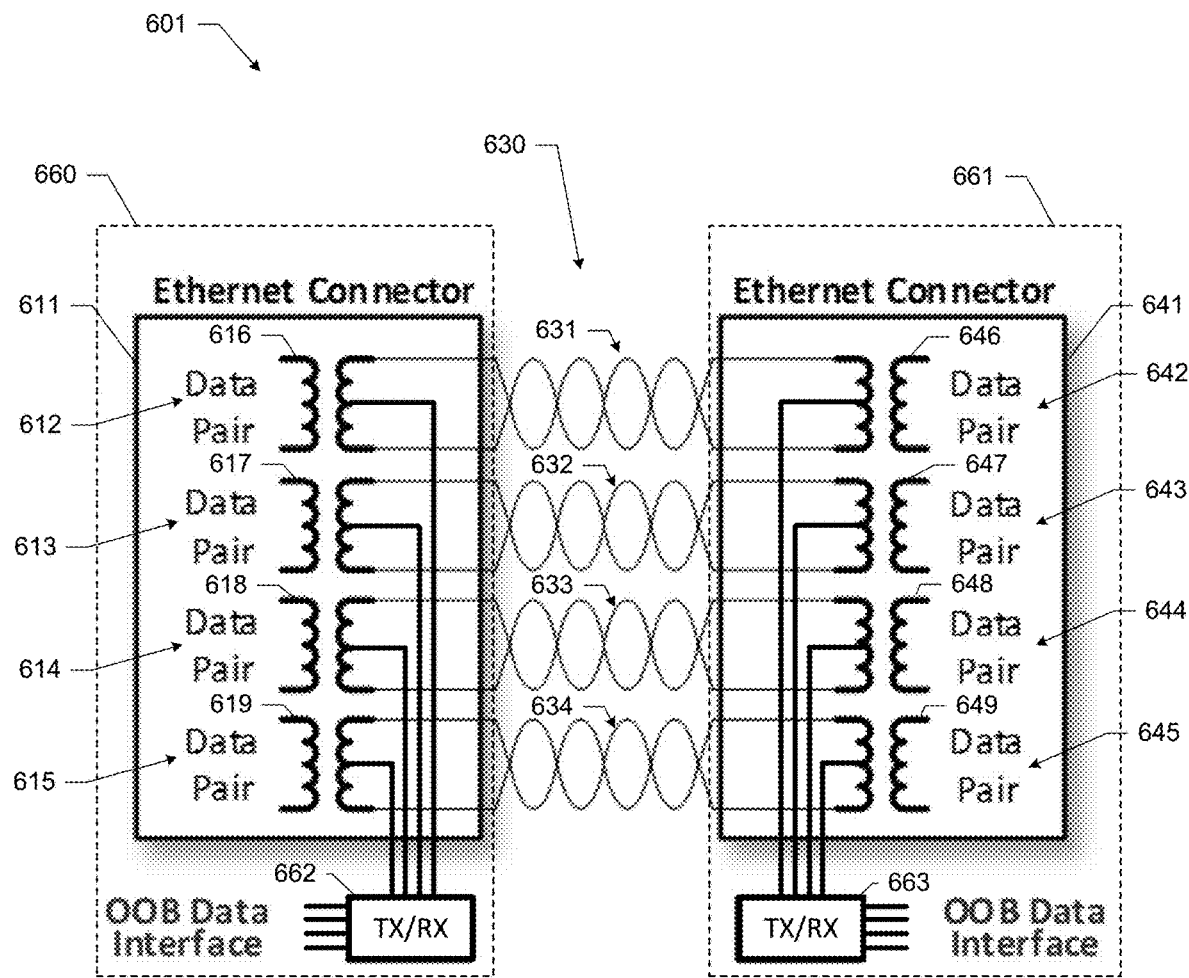
FIG. 6B illustrates components of an example out-of-band network that operates that operates with four-wire out-of-band passive interface devices according to some example embodiments.

Referring now to FIG. 6B, another example embodiment of an OOB network 601 is shown. The OOB network 601 includes a first OOB passive interface device 660, the twisted-pair cable 630, and a second OOB passive interface device 661. The first OOB passive interface device 660 and the second OOB passive interface device 640 may be configured to operate as four-wire devices that support four-wire communications protocols (e.g., RS-232) on the OOB network 601. In this regard, the first OOB passive interface device 660 and the second OOB passive interface device 661 may be constructed and connected in a similar manner as the first OOB passive interface device 610 and the second OOB passive interface device 640 shown in FIG. 6A. However, the OOB data interface 662 of the first OOB passive interface device 660 may have four connections with one to each of the centertaps of the transformers 616, 617, 618, and 619. Similarly, the OOB data interface 663 of the second OOB passive interface device 661 may have four connections with one to each of the centertaps of the transformers 646, 647, 648, and 649. Since the transformers 616, 617, 618, and 619, and the transformers 646, 647, 648, and 649 are connected to twisted-pairs 631, 632, 633, and 634, respectively, four-wire communications protocols can be implemented using all four of the twisted-pairs of the cable 630. Accordingly, signals provided to the OOB data interface 662 may be injected onto the twisted-pairs 631, 632, 633, and 634 in combination with the primary signals provided via the data pairs 612, 613, 614, and 615 for provision to the second OOB passive interface device 661. Alternatively, signals may be extracted via the centertaps of the transformers 646, 647, 648, and 649 and provided as an output via the OOB data interface 663 as a four-wire protocol signal.

Figure 7:
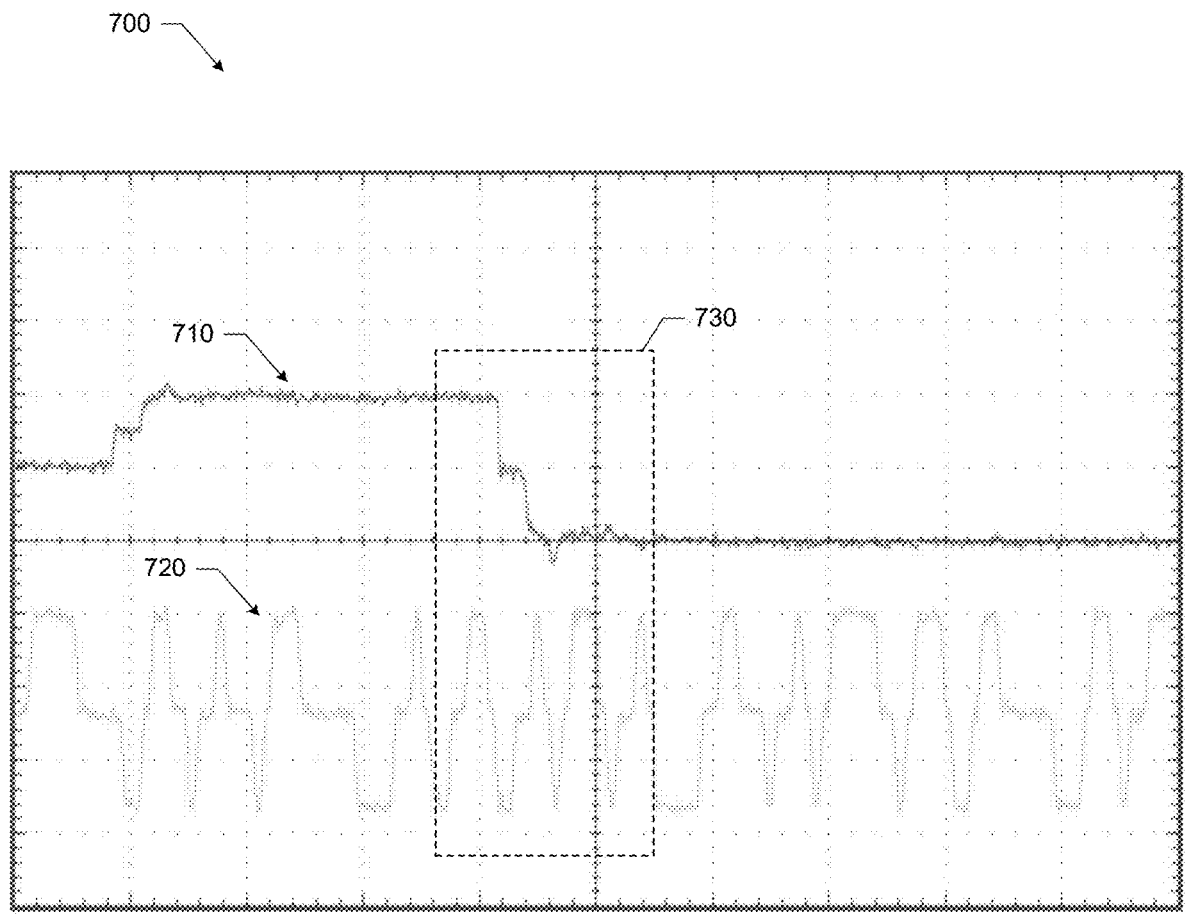
FIG. 7 shows a signaling graph illustrating a lack of interference between signaling for the primary network and the out-of-band network according to some example embodiments.

FIG. 7 includes a graph 700 illustrating an OOB network signal 710 and a twisted-pair differential signal 720. The twisted-pair differential signal 720 includes the injected OOB network signal 710, but because the signal is applied via a centertap transformer, the OOB signal injects no differential on the twisted-pair differential signal 720. As can be seen in region 730, despite the changes in the voltage of the OOB network signal 710, no effect can be seen on the twisted-pair differential signal 720. Accordingly, this again shows that the injection of the OOB network signal does not create interference with a primary network signal.

Figure 8:
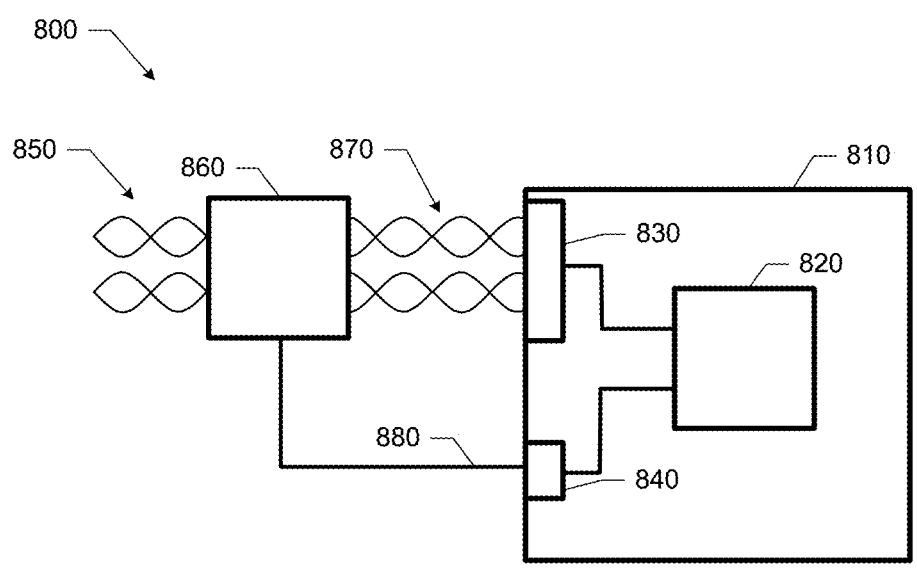
FIG. 8 illustrates an example dual network device that may be configured to leverage communications on both the primary and the out-of-band networks according to some example embodiments.

Now referring to FIG. 8, an assembly 800 is shown that includes a dual network device 810. According to some example embodiments, the dual network device may include processing circuitry 820, a primary network interface 830 and an OOB network interface 840. The dual network device 810 may be connected to an OOB passive interface device 860 via a twisted-pair cable 870 and an OOB connection 880. The OOB passive interface device 860 may be connected to a twisted-pair cable 850.

The twisted-pair cable 850 may include signaling in the form of a combined signal with a primary network signal and an OOB network signal. The OOB network signal may have been injected onto the twisted-pair cable 850 as a differential signal between the centertaps of the two sets of twisted-pairs with the primary network signal. As described above, the OOB passive interface device 860 may extract the OOB signal and provide the OOB signal to the processing circuitry 820 via the OOB network interface 840. The OOB passive interface device 860 may also pass the primary network signal, after extraction of the OOB network signal, to the processing circuitry 820 via the primary network interface 830.

According to some example embodiments, the processing circuitry 820 may include a software-configured processing device that executes instructions stored in a memory or a hardware configured processing device, such as an application specific integrated circuit (ASIC) or a field programmable gate array (FPGA). In either case, the processing circuitry 820 may be configured to perform a signal integrity check between the received OOB network signal and the primary network signal. In this regard, another dual network device may have sent redundant operational instructions to the dual network device 810 via both the primary network and the OOB network. Since the networks operate separately, the same instructions should be received by the dual network device 810 via each of the primary network and the OOB network. If the instructions are different, then an assumption can be made that one of the networks has be attacked, and further communications are unreliable. As such, the processing circuitry 820 may be configured to compare the instructions received in the primary network signal and the instructions received in the OOB network signal to make a security assessment.

Alternatively, such a dual network device 810 may be configured to operate by leveraging both the primary network and the OOB network. In this regard, for example, the primary network may be used as a data channel (e.g., for video data). The OOB network may be used as a command and control channel for transmitting operational instructions.

Figure 9:
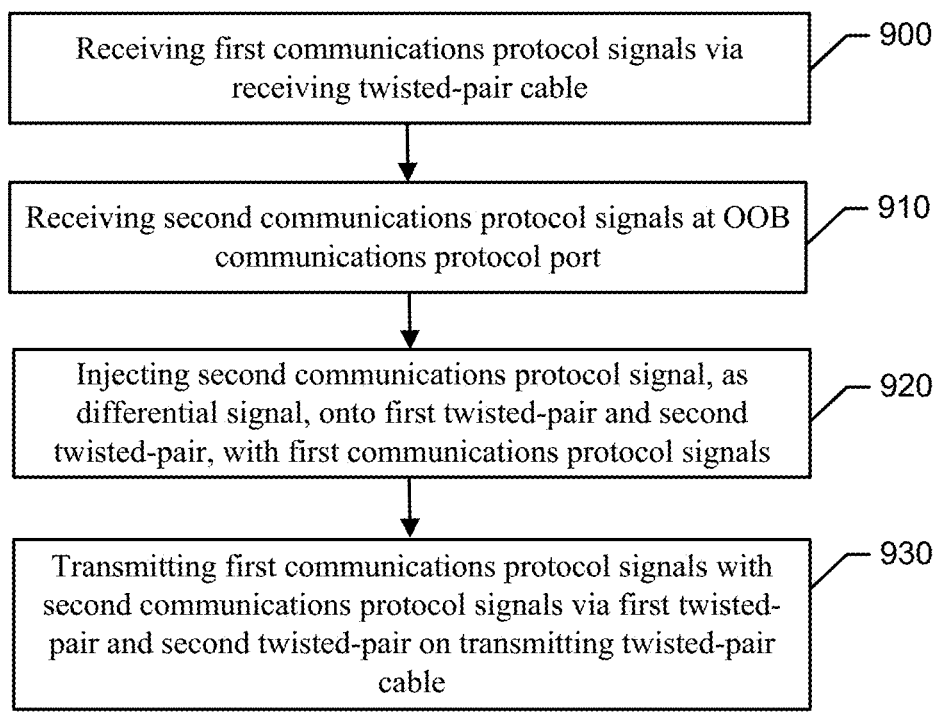
FIG. 9 illustrates a flow chart of an example method for implementing an out-of-band network according to some example embodiments.

With reference now to FIG. 9, an example embodiment in the form of a method for implementing an out-of-band (OOB) network is provided in association with a flowchart. According to some example embodiments, elements of the example method may be implemented by a OOB passive interface device, as described herein. In this regard, the example method may include, at 900, receiving first communications protocol signals via a receiving twisted-pair cable. At 910, the example method may include receiving second communications protocol signals at an OOB communications protocol port. Further, at 920, the example method may include injecting the second communications protocol signal, as a differential signal, between a first twisted-pair and a second twisted-pair, with the first communications protocol signals. Finally, at 930, the example method may include transmitting the first communications protocol signals with the second communications protocol signals via the first twisted-pair and the second twisted-pair on a transmitting twisted-pair cable.

According to some example embodiments, injecting the second communications protocol signals may include injecting the second communications protocol signals onto centertaps of a first transformer and a second transformer. In this regard, the first transformer and second transformer may be connected to the receiving twisted-pair cable and the transmitting twisted-pair cable. Further, according to some example embodiments, the example method may include additional operations. In this regard, the example method may further include receiving the first communications protocol signals with the second communications protocol signals (e.g., at a second OOB passive interface device), removing the second communications protocol signals for provision of the second communications protocol signals to an OOB network node, and passing the first communications protocol signals, unaffected by the injection of the second communications protocol signals, to a primary network node.

Additional example embodiments will now be described. According to some example embodiments, a communications system is provided. The communications system may include a primary network communicating in accordance with a first communications protocol. The primary network may include a first primary network node and a second primary network node. The first primary network node and the second primary network node may be connected via a twisted-pair cable. The first primary network node may be configured to transmit first communications protocol signals on the twisted-pair cable to the second primary network node. The communications system may also include an out-of-band (OOB) network communicating in accordance with a second communications protocol. The OOB network may include a first OOB network node and a second OOB network node. The first OOB network node may be connected to the twisted-pair cable via a first OOB passive interface device that is connected between the first primary network node and the second primary network node. The second OOB network node may be connected to the twisted-pair cable via a second OOB passive interface device that is connected between the first primary network node and the second primary network node. The first OOB passive interface device may be configured to receive second communications protocol signals from the first OOB network node and inject the second communications protocol signals onto the twisted-pair cable with the first communications protocol signals. The second OOB network node may be configured to receive and extract the injected second communications protocol signals from the twisted pair cable for provision to the second OOB network node. Extraction of the injected second communications protocol signals may be performed such that the first communications protocol signals are received by the second primary network node unaffected by the injection of the second communications protocol signals.

According to some example embodiments, the twisted-pair cable may include a plurality of twisted pairs. The plurality of twisted pairs may include a first twisted pair and a second twisted pair. The first OOB passive interface device may be configured to inject the second communications protocol signals as a differential signal between the first twisted pair and the second twisted pair. According to some example embodiments, the first OOB passive interface device may be configured to inject the second communications protocol signals as a differential signal between the first twisted pair and the second twisted pair. The differential signal may be applied to the first twisted pair such that no differential voltage is introduced between signals on each of the wires of the first twisted pair. The differential signal may be applied to the second twisted pair such that no differential voltage is introduced between signals on each of the wires of the second twisted pair. According to some example embodiments, the first OOB passive interface device may include a first transformer coupled to the first twisted pair and a second transformer coupled to the second twisted pair. The first OOB passive interface device may be configured to inject the second communications protocol signals as a differential signal on a centertap of first transformer and a centertap of the second transformer. According to some example embodiments, the second OOB passive interface device may include a third transformer coupled to the first twisted pair and a fourth transformer coupled to the second twisted pair. The second OOB passive interface device may be configured to receive and extract the second communications protocol signals as a differential signal from a centertap of third transformer and a centertap of the fourth transformer. According to some example embodiments, the twisted-pair cable may include a first portion and a second portion. A third primary network node may be connected between the first portion and the second portion of the twisted-pair cable. The first OOB passive interface device and a third OOB passive interface device may be connected to the first portion of the twisted-pair cable. The second OOB passive interface device and a fourth OOB passive interface device may be connected to the second portion of the twisted-pair cable. The OOB network may further include an OOB bridge connection that bridges over the third primary network node from the third OOB passive interface device to the fourth OOB passive interface device. According to some example embodiments, the second communications protocol may be a serial communications protocol. According to some example embodiments, the second primary network node and the second OOB network node may be housed within a dual protocol device. The dual protocol device may be configured to compare a first communication received via the first communications protocol signals with a second communication received via the second communications protocol signals. According to some example embodiments, the primary network may be disposed within a first security domain and the OOB network may be disposed with a second security domain. According to some example embodiments, wherein the OOB network is configured to continue to operate when a non-physical layer failure of the primary network occurs.

According to some example embodiments, an out-of-band (OOB) passive interface device is provided. The OOB passive interface device may include a first Ethernet port, a second Ethernet port, and an OOB communications protocol port. The OOB passive interface device may also include a first transformer and a second transformer. A first pair of conductors from the first Ethernet port may be connected to first terminals of the first transformer and a second pair of conductors from the second Ethernet port may be connected to second terminals of the first transformer. A third pair of conductors from the first Ethernet port may be connected to first terminals of the second transformer and a fourth pair of conductors from the second Ethernet port may be connected to second terminals of the second transformer. A first OOB interface conductor may be connected from a centertap of the first transformer to the OOB communication protocol port. A second OOB interface conductor may be connected from a centertap of the second transformer to the OOB communication protocol port.

According to some example embodiments, the OOB communications protocol port may be configured to receive OOB communications protocol signals to be injected as a differential signal onto the centertap of the first transformer and the centertap of the second transformer. According to some example embodiments, the OOB communications protocol port may be configured to receive OOB communications protocol signals from the centertap of the first transformer and the centertap of the second transformer for provision to an external OOB network node via a connection to the OOB communications protocol port. According to some example embodiments, the OOB communications protocol port may be configured to receive OOB communications protocol signals as serial communications signals to be injected as a differential signal onto the centertap of the first transformer and the centertap of the second transformer. The OOB communications protocol port may be configured to receive OOB communications protocol signals as serial communications signals for provision to an external OOB network node via a connection to the OOB communications protocol port. According to some example embodiments, the first transformer and the second transformer are 1:1 transformers and have a 1:1 turns ratio. According to some example embodiments, the first Ethernet port and the second Ethernet port may be configured to couple with twisted-pair cables. According to some example embodiments, the OOB passive interface device does not include a processing device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A communications system comprising:
a primary network communicating in accordance with a first communications protocol, the primary network comprising a first primary network node and a second primary network node, the first primary network node and the second primary network node being connected via a twisted-pair cable, the first primary network node being configured to transmit first communications protocol signals on the twisted-pair cable to the second primary network node; and
an out-of-band (OOB) network communicating in accordance with a second communications protocol, the OOB network comprising a first OOB network node and a second OOB network node, the first OOB network node being connected to the twisted-pair cable via a first OOB passive interface device that is connected between the first primary network node and the second primary network node, the second OOB network node being connected to the twisted-pair cable via a second OOB passive interface device that is connected between the first primary network node and the second primary network node,
wherein the first OOB passive interface device is configured to receive second communications protocol signals from the first OOB network node and inject the second communications protocol signals onto the twisted-pair cable with the first communications protocol signals, and
wherein the second OOB network node is configured to receive and extract the injected second communications protocol signals from the twisted pair cable for provision to the second OOB network node, wherein extraction of the injected second communications protocol signals is performed such that the first communications protocol signals are received by the second primary network node unaffected by the injection of the second communications protocol signals.

2. The communications system of claim 1, wherein
the twisted-pair cable comprises a plurality of twisted pairs, the plurality of twisted pairs comprising a first twisted pair and a second twisted pair, and
the first OOB passive interface device is configured to inject the second communications protocol signals as a differential signal between the first twisted pair and the second twisted pair.

3. The communications system of claim 1, wherein
the twisted-pair cable comprises a plurality of twisted pairs, the plurality of twisted pairs comprising a first twisted pair and a second twisted pair,
the first OOB passive interface device is configured to inject the second communications protocol signals as a differential signal between the first twisted pair and the second twisted pair,
the differential signal is applied to the first twisted pair such that no differential voltage is introduced between signals on each wire of the first twisted pair, and
the differential signal is applied to the second twisted pair such that no differential voltage is introduced between signals on each wire of the second twisted pair.

4. The communications system of claim 1, wherein
the twisted-pair cable comprises a plurality of twisted pairs, the plurality of twisted pairs comprising a first twisted pair and a second twisted pair,
the first OOB passive interface device comprises a first transformer coupled to the first twisted pair and a second transformer coupled to the second twisted pair, and
the first OOB passive interface device is configured to inject the second communications protocol signals as a differential signal on a centertap of first transformer and a centertap of the second transformer.

5. The communications system of claim 4, wherein
the second OOB passive interface device comprises a third transformer coupled to the first twisted pair and a fourth transformer coupled to the second twisted pair, and
the second OOB passive interface device is configured to receive and extract the second communications protocol signals as a differential signal from a centertap of third transformer and a centertap of the fourth transformer.

6. The communications system of claim 1, wherein
the twisted pair cable comprises a first portion and a second portion,
a third primary network node is connected between the first portion and the second portion of the twisted-pair cable,
the first OOB passive interface device and a third OOB passive interface device are connected to the first portion of the twisted-pair cable,
the second OOB passive interface device and a fourth OOB passive interface device are connected to the second portion of the twisted-pair cable, and
the OOB network further comprises an OOB bridge connection that bridges over the third primary network node from the third OOB passive interface device to the fourth OOB passive interface device.

7. The communications system of claim 1, wherein the second communications protocol is a serial communications protocol.

8. The communications system of claim 1, wherein
the second primary network node and the second OOB network node are housed within a dual protocol device, and
the dual protocol device is configured to compare a first communication received via the first communications protocol signals with a second communication received via the second communications protocol signals.

9. The communications system of claim 1, wherein the primary network is disposed within a first security domain and the OOB network is disposed with a second security domain.

10. The communications system of claim 1, wherein the OOB network is configured to continue to operate when a non-physical layer failure of the primary network occurs.

11. An out-of-band (OOB) passive interface device comprising:
a first Ethernet port;
a second Ethernet port;
an OOB communications protocol port;
a first transformer; and
a second transformer,
wherein a first pair of conductors from the first Ethernet port are connected to first terminals of the first transformer and a second pair of conductors from the second Ethernet port are connected to second terminals of the first transformer,
wherein a third pair of conductors from the first Ethernet port are connected to first terminals of the second transformer and a fourth pair of conductors from the second Ethernet port are connected to second terminals of the second transformer,
wherein a first OOB interface conductor is connected from a centertap of the first transformer to the OOB communications protocol port, and
wherein a second OOB interface conductor is connected from a centertap of the second transformer to the OOB communications protocol port;
wherein the connection to the centertap of the first transformer and the connection to the centertap of the second transformer are configured to inject OOB communications protocol signals received at OOB communications protocol port, as differential signals, between the first pair of conductors from the first Ethernet port and the third pair of conductors from the first Ethernet port, with first communications protocol signals received at the first Ethernet, the first communications protocol signals with the injected OOB communications protocol signals being provided to the second Ethernet port for transmitting; and
wherein the connection to the centertap of the first transformer and the connection to the centertap of the second transformer are also configured to extract, from first communications protocol signals with injected OOB communications protocol signals received at the second Ethernet port, OOB communications protocol signals for provision to the OOB communications protocol port and provide first communications protocol signals, unaffected by the injection of the OOB communications protocol signals, to the first Ethernet port.

12. The out-of-band (OOB) passive interface device of claim 11, wherein the OOB communications protocol port is configured to receive OOB communications protocol signals to be injected as the differential signals onto the centertap of the first transformer and the centertap of the second transformer.

13. The out-of-band (OOB) passive interface device of claim 11, wherein the OOB communications protocol port is configured to receive OOB communications protocol signals from the centertap of the first transformer and the centertap of the second transformer for provision to an external OOB network node via a connection to the OOB communications protocol port.

14. The out-of-band (OOB) passive interface device of claim 11, wherein
the OOB communications protocol port is configured to receive OOB communications protocol signals as serial communications signals to be injected as the differential signals onto the centertap of the first transformer and the centertap of the second transformer, and
the OOB communications protocol port is configured to receive OOB communications protocol signals as serial communications signals for provision to an external OOB network node via the connections to the centertap of the first transformer and the centertap of the second transformer.

15. The out-of-band (OOB) passive interface device of claim 11, wherein the first transformer and the second transformer have a 1:1 turns ratio.

16. The out-of-band (OOB) passive interface device of claim 11, wherein the first Ethernet port and the second Ethernet port may be configured to couple with twisted-pair cables.

17. The out-of-band (OOB) passive interface device of claim 11, wherein the OOB passive interface device does not comprise a processing device.

18. A method for implementing an out-of-band (OOB) network, the method comprising:
receiving first communications protocol signals via a receiving twisted-pair cable;
receiving a second communications protocol signals at an OOB communications protocol port;
injecting the second communications protocol signals, as differential signals, between a first twisted-pair and a second twisted-pair, with the first communications protocol signals;
transmitting the first communications protocol signals with the second communications protocol signals via the first twisted-pair and the second twisted-pair on a transmitting twisted-pair cable;
receiving the first communications protocol signals with the second communications protocol signals;
removing the second communications protocol signals for provision of the second communications protocol signals to an OOB network node; and
passing the first communications protocol signals, unaffected by the injection of the second communications protocol signals, to a primary network node.

19. The method of claim 18, wherein the injecting the second communications protocol signals comprises injecting the second communications protocol signals onto centertaps of a first transformer and a second transformer, the first transformer and second transformer being connected to the receiving twisted-pair cable and the transmitting twisted-pair cable.

* * * * *